United States Patent [19]

Torrey

[11] Patent Number: 5,687,532
[45] Date of Patent: Nov. 18, 1997

[54] FIRE ENDURANCE RATED PLASTIC ARTICLES FOR USE IN FIRE RATED ASSEMBLIES

[75] Inventor: Bruce M. Torrey, Pittsfield, Mass.

[73] Assignee: General Electric Company, Pittsfield, Mass.

[21] Appl. No.: 642,979

[22] Filed: May 6, 1996

[51] Int. Cl.⁶ ............................. E06B 1/52; E06B 1/30
[52] U.S. Cl. ................... 52/656.3; 52/204.1; 52/232; 52/656.4; 52/656.5; 49/504; 49/DIG. 2
[58] Field of Search ........................... 52/232, 656.3, 52/656.4, 656.5, 204.1; 49/504, DIG. 2

[56] References Cited

U.S. PATENT DOCUMENTS

| | | | |
|---|---|---|---|
| 4,649,089 | 3/1987 | Thwaites | 52/232 X |
| 4,660,338 | 4/1987 | Wagner | 52/232 |
| 4,706,426 | 11/1987 | Rumsey | 52/232 |
| 4,850,173 | 7/1989 | Beyer et al. | 52/232 X |
| 5,088,249 | 2/1992 | Marzouki | 52/232 |
| 5,279,087 | 1/1994 | Mann | 52/232 |
| 5,347,780 | 9/1994 | Richards et al. | 52/232 X |
| 5,501,045 | 3/1996 | Wexler | 52/232 |

Primary Examiner—Christopher Kent

[57] ABSTRACT

A plastic article such as a thermoplastic extruded door frame or laminated composite floor for railroad cars having at least one internal cavity wherein the cavity is filled with an intumescent. When exposed to fire, such an article retards or inhibits the break-through of fire into an adjoining compartment or room for a sufficient time to allow occupants thereof to evacuate the adjoining compartment or to extinguish the fire. The article has at least one internal cavity filled with an intumescent and meets the requirements of ASTM E 152. The plastics employed herein may be either thermoplastic or thermoset.

4 Claims, 2 Drawing Sheets

FIRE ENDURANCE RATED PLASTIC ARTICLES FOR USE IN FIRE RATED ASSEMBLIES

FIELD OF THE INVENTION

This invention is directed to the use of plastics in fire rated assemblies in building and construction applications in which fire endurance is required. More specifically, it is directed to thermoplastic or thermoset articles that are filled with intumescents. A particular application, for example, is in fire rated door assemblies. When such plastics are used as door frames for door assemblies, and employed in fire rated assemblies for such applications, they must meet certain fire tests by maintaining a barrier to a fire on the unexposed side of a door assembly. They should also provide sufficient structural integrity and, in some cases, be able to withstand a stream of water from a fire hose, which may be a portion of the fire rating test.

BACKGROUND OF THE INVENTION

The use of materials in building and construction applications that are required by law to be fire endurance rated and, thus, requires one to employ more traditional materials like steel, gypsum, concrete, and the like. In order to proliferate the use of plastics in building and construction applications, the issue of fire and or flammability performance must be satisfied. Thus, one must address the fire endurance performance of plastic articles used in such applications as door assemblies that require fire ratings according to standards like American Society of Testing and Materials (ASTM E 152 "Fire Tests of Door Assemblies"). In order for a "fire-stop" material to work it must remain behind during the test after the plastic has melted away.

To the best of applicant's knowledge, no one has ever proposed the use of plastic articles, i.e., thermoset or thermoplastic, for such applications as door frames for fire rated door assemblies, or any other application requiring fire endurance rating. Twenty (20) minute rated door assemblies (the minimum performance level) can have frames made of heavy wood. Typically, rated door frames are made of steel and are of very specific designs. Steel frames have difficulty passing the ASTM E 152 protocol because of warpage under the influence of intense heat. Steel and heavy wood frames are of special designs for the purposes of meeting the requirements of ASTM E 152 and have, in some instances, used intumescent fire-stop materials to supplement sealing areas, but not as the primary means of achieving structural integrity during the test exposure nor are they considered as the primary means of fire-stopping a door assembly.

Current trends in the regulatory community will require changes in the testing protocol to include positive pressure on the furnace side of a test sample. Since the use of steel currently causes problems due to warpage, the new protocol will now further challenge steel by exploiting any openings caused by warpage. Current use of wood in 20 minute door assemblies meets the protocol by a very slim margin and usually does not include the hose stream portion of the test. The change to positive furnace pressures will almost certainly require the redesign, if not the elimination, of wood frames in 20 minute rated door assemblies.

In addition to these challenges, steel and wood will have further difficulties in meeting the water hose stream portion of the protocol. This requirement further challenges weaknesses in the system by exploiting openings caused by warpage.

The problem that faces the industry is how to achieve the use of plastics in applications where fire endurance is required. In the ASTM E 152 test protocol, the side of the assembly exposed to the test furnace reaches temperatures as follows: at 1000° F. at 5 minutes, 1300° F. at 10 minutes, 1550° F. at 30 minutes and so on. Door assemblies are typically rated for 20, 45 and 90 minutes duration. Since plastic materials cannot withstand anywhere near the temperatures required of the test, something must stay behind to take the place once the plastic has melted away on the fire exposed side or provide insulated properties that protect the plastic on the unexposed fire side in order to maintain structural integrity. These materials must maintain a barrier to the fire on the protected side of the assembly and in some cases provide enough structural integrity to withstand the hose stream portion of the test.

SUMMARY OF THE INVENTION

An object of this invention is to provide the building and construction industry with a residential or commercial construction assembly that utilizes a plastic formed article. The plastics that can be employed herein are thermoset or thermoplastic materials and may be formed by any of the known plastic processes, such as, but not limited thereto, molding, i.e., injection, compression, transfer, blow molding, co-injection, etc.; extrusion, i.e., profile, sheet, co-extrusion, etc.; thermoforming; pultrusion, etc. However, for simplicity purposes, thermoplastic extrusion profiles, i.e., door frames, will be referred to herein for the purposes of describing this invention, but shall include all other formed thermoset or thermoplastic articles made by any of the processes described above. The employment of these "fire rated" frame extrusions provides for all of the benefits associated with plastics, as well as the benefits of the fire performance required by law. The ability to fill a plastic extrusion profile cavity with fire-stopping materials has advantages over "add-on" systems used for metal or wood and over the use of metal or wood altogether. The extrusion cavity provides for a convenient place to employ a fire-stopping material while hiding it from view, protecting it from weather, and it provides a function without interfering with operable mechanisms of a door assembly.

Another object of this invention is to provide a plastic door assembly that will meet the performance features required of a door assembly by filling at least one cavity in a thermoplastic extruded door frame with a "fire-stop" material or intumescent.

Still a further object of this invention is to provide an extruded thermoplastic door frame that meets fire endurance protocol.

These and other objects of this invention will become apparent from the following description.

DETAILED DESCRIPTION OF THE INVENTION

Figure 1:
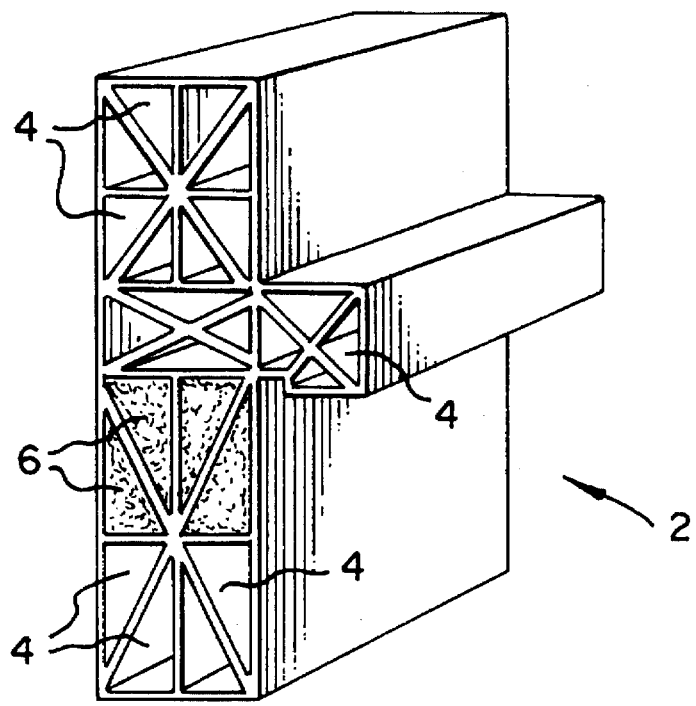
FIG. 1 is a perspective view showing a cross-section of a door frame.

This invention is directed to the utilization of plastic assemblies for use in building and construction applications that meet fire ratings for such assemblies as an extruded thermoplastic door frame. This invention meets the fire endurance performance required for door assemblies when tested in accordance with such tests as ASTM E 152, or NFPA 252-1984 (Standard Methods of Fire Tests of Door Assemblies) or ASTM E 119, which all have essentially the same test procedures.

In an extruded thermoplastic hollow or honeycomb door frame, the cavity or cavities are filled with an intumescent. Generally, there are two types of intumescents, namely, hard and soft intumescents. While, in the practice of this invention, either hard or soft intumscents may be used, hard intumescents are preferred. A preferred intumescent is synthetic rubber polychloropene.

Hollow, extruded thermoplastic door frames have not been generally employed or accepted as part of a door assembly, particularly in commercial buildings. The problem is that such hollow, extruded door frames, when exposed to an actual fire or fire test, fail by developing openings in the thermoplastic extruded door frame due to the melting or burning of the thermoplastic. When this occurs, flames shoot out through the openings setting an adjacent room or compartment on fire or increasing the burning of the door itself. When this occurs, flames escape from the burning room igniting the adjacent room, thereby defeating the purpose of containing a fire for a sufficient period of time to allow occupants of the building to leave. Also, by containing the fire, it is easier to control and extinguish the fire.

In the practice of this invention, at least one cavity of an extruded thermoplastic door frame is filled with an intumescent. When the door frame is exposed to heat or flame and the thermoplastic melts, the intumescent expands and fills the opening. This stops and prevents the flame from penetrating the door frame and exposing the adjoining room to the fire. Eventually, the intumescent will fill the space between the door and the wall. In most commercial and residential buildings, the walls are composed of gypsum such as Sheet Rock® or other materials that are resistant to fires. Even wooden 2"×4" studs within a wall will take 20 minutes to reach equilibrium with the heat of a fire. Walls have been known to withstand one (1) hour of fire exposure. Even hollow, wooden doors will withstand more than 20 minutes of exposure to fire before the door will burn through. Hollow, steel doors will warp and twist, and when filled with a polyurethane, the polyurethane will burn. Therefore, by employing an intumescent filled thermoplastic extruded door frame, the intumescent will fill the space between the door and wall, thus sealing off the room from fire breaking through into adjoining rooms and thereby igniting adjoining rooms.

Any intumescents can be employed in the practice of this invention and include such materials as neoprene rubber in extruded form both in closed-cell sponge or solid, laminated thermoplastic composites which expand upon exposure to heat or fire such as glassed-filled polypropylene, etc. and the like, intumescents in the form of paints or putties, intumescent polymers such as branched polycarbonates, silicones, and the like.

As stated previously, this invention is directed to a plastic assembly for use in commercial or residential building applications, such as a door frame, and wherein the assembly has one or more cavities. Either one or more of the cavities is filled with an intumescent. At least one cavity must be filled with an intumescent in the practice of this invention in order to meet the fire rating requirements. In some tests when all of the cavities were filled with an intumescent, some of the filled cavities did not see the high temperature of the test due to insulation effect.

Thermoplastics that may be used in extruding or molding the door assemblies are such thermoplastics as acrylonitrile-styrene-acrylonitrile (ASA), blends of ASA and polyvinyl chloride (PVC), acrylonitrile-butadiene-styrene (ABS), polystyrene including high impact polystyrene, polyesters such as polybutylene terephthalate (PBT) or polyethylene terephthalate (PET), polyphenylene ethers and modified polyphenylene ethers (PPE), polycarbonates (PC), blends of polycarbonates with other polymers such as ABS or polyesters or other thermoplastics compatible with polycarbonates, blends of polyphenylene ether thermoplastics with other thermoplastics such as polyamides or polyesters and any other thermoplastics compatible with PPE, and such other thermoplastics that can be formed into the formed articles of this invention.

The thermoset plastics that may be employed in the practice of this invention are such thermoset plastics as phenol formaldehyde, epoxy, melamine formaldehyde, saturated polyester, cross-linked acrylic, urethane, etc., and the like.

Figure 2:
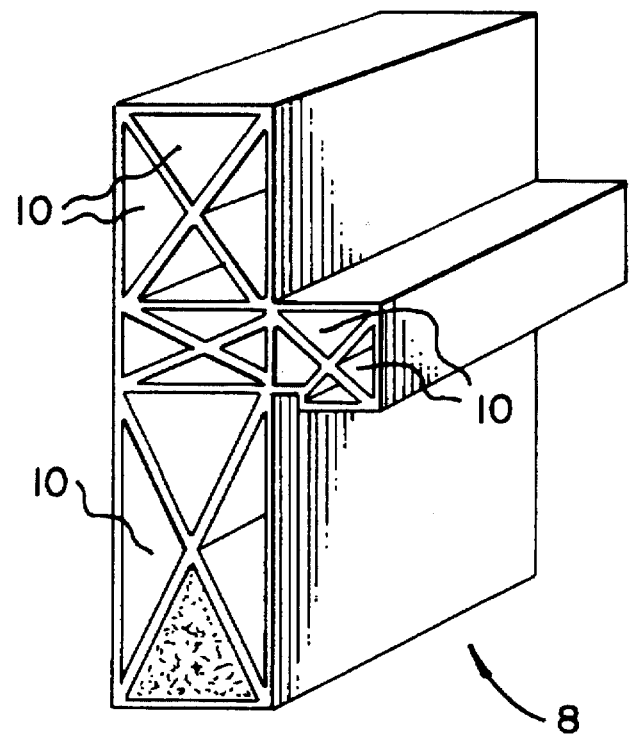
FIG. 2 is a perspective view of another door frame showing a cross-section.

The structure of a door frame can be any conventional plastic formed door frame and, as stated previously, is described in terms of a thermoplastic door frame. The thermoplastic door frame should have one or more cavities or it may have a honeycomb configuration. Honeycomb configuration, as shown on FIG. 1 and FIG. 2, is preferred since it adds rigidity and strength to the door frame. With the honeycomb configuration, there are multi-cavities and in the practice of this invention, at least one cavity is filled with an intumescent. However, more than one cavity may be filled or all of the cavities may be filled with an intumescent where there are multi-cavities in the thermoplastic door frame.

While this invention has been primarily described in terms of a thermoplastic door frame for building and construction applications, it is nevertheless applicable to any plastic part where sealing of a particular room or compartment is wanted when exposed to fire in order to block or delay break-through of a fire into an adjacent room or compartment. Again, the purpose is to allow time for persons to evacuate a structure or for extinguishing the fire. Such other applications include doors, walls, ceilings, floors such as in house trailers, recreational vehicles or other structures where plastics are used to fabricate walls, floors or ceilings, or rail cars, i.e., sides, floors and ceilings, where containment of a fire is wanted in order to allow evacuation of such structures, or to extinguish the fire.

DETAILED DESCRIPTION OF THE DRAWINGS

FIG. 1 is a cut away showing part of an extruded door frame 2 comprising a honeycomb configuration with unfilled cavities 4 and intumescent filled cavities 6.

FIG. 2 is a cut away showing part of another extruded door frame profile 8 having a different honeycomb configuration from that shown in FIG. 1. In FIG. 2, door frame 8 has unfilled cavities 10 and intumescent filled cavity 12.

Figure 3:
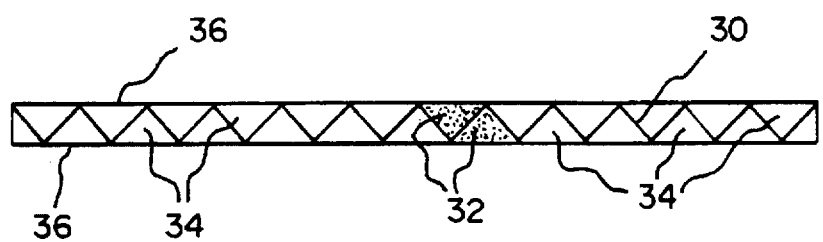
FIG. 3 is a cross-section of a laminated composite.

FIG. 3 is a cut away view of a laminated composite showing extruded corrugated core 30 with cavities 32 filled with an intumescent and cavities 34 being unfilled. Surface layer 36 is laminated to corrugated core 30.

Figure 4:
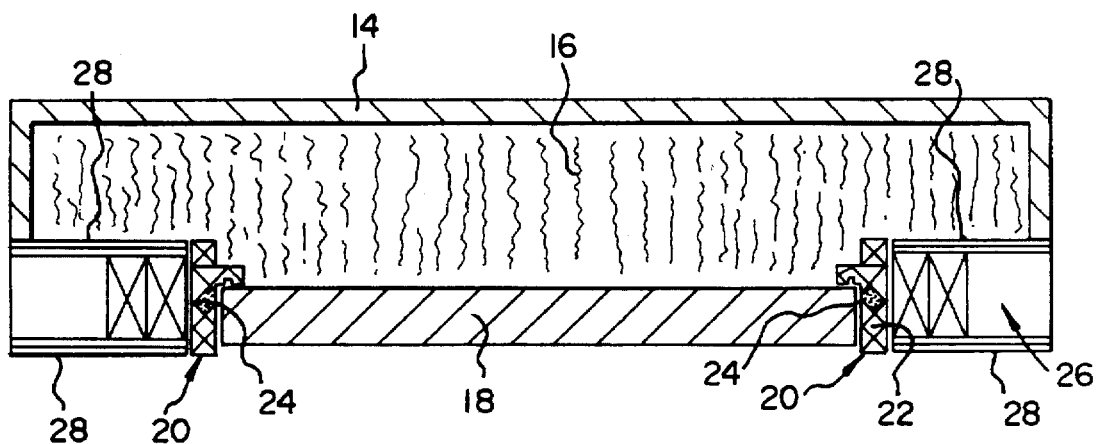
FIG. 4 is a top view of a simulated door assembly and a test furnace.

FIG. 4 is a cut away top view of the test furnace and simulated door assembly. FIG. 4 comprises furnace 14, gas fired (radiant heat) 16, simulated door 18 composed of gypsum Sheet Rock®, extruded door frame 20, cavities 22 in door frame 20, intumescent filled cavities 24, simulated wall assembly 26, with gypsum Sheet Rock® 28 covering the outside and inside wall.

DETAILED DESCRIPTION OF THE TESTS

The following tests were conducted on an extruded door frame profile extruded out of acrylonitrile-butadiene-styrene (ABS). The test was conducted in accordance with a modified version of ASTM E 119 which ASTM E 119 is the same test procedure as ASTM E 152 protocol, which is also the same procedure as Fire Tests of Door Assemblies NFPA 252-1984. The modification is in the size of the test chamber which in the standard test procedure is about a 10'×10'×10' simulated room with one end open and in which opening the test assembly (the door assembly) is placed. The simulated room has a furnace at the opposite end of the test chamber or room. The modified ASTM E 119 procedure employs the same procedures and test conditions employed in ASTM E 119, except that the simulated test room is on a smaller scale, namely a 3'×3'×3' test chamber with the simulated door assembly also being on a smaller scale.

The simulated door assembly for this test procedure consisted of a 42"×36" wood frame, which was made up of 4 pieces of 3⅝" wood studs. Another 4 pieces of 3⅝" wood studs were assembled to form another frame 38"×16". The 38"×16" wood frame was placed in the center of the 42"×36" wood frame, which was then used to cover the open end of the chamber. The cavity around the perimeter between the two wood frames was covered with ⅝" thick type X gypsum board. Strips of ⅝" thick type X gypsum board were cut and attached to the wood frame using gypboard screws. One pair of plastic door frames were attached to the vertical wood studs of the inner wood frame. One cell was filled with an intumescent. One piece of ⅝" thick type X gypsum board 15"×38" high was positioned in the opening of the inner wood frame between the plastic door frames. The overall assembly measured 42"×36"×3⅜". The intumescent employed as the intumescent filler in one of the cavities of the extruded door frame was FS3002 Fire Stop Intumescent manufactured by Intumet, Inc., a Division of Zero International, Inc., Bronx, N.Y. The fire test was conducted following the time-temperature curve of ASTM E 119, which is the same time-temperature curve in ASTM E 152 and NFPA 252-1984. While the time-temperature curve is defined in detail in the above test procedure, a brief time-temperature chart of the curve is as follows:

1000° F. (538° C.) . . . at 5 min.
1300° F. (704° C.) . . . at 10 min.
1550° F. (843° C.) . . . at 30 min.
1638° F. (892° C.) . . . at 45 min.
1700° F. (927° C.) . . . at 1 hr.
1792° F. (978° C.) . . . at 1½ hrs.
1925° F. (1052° C.) . . . at 3 hrs.

The furnace used in this test measures 3'×3'×3'. The outside construction is steel and the furnace is lined with a ceramic refractory insulation. The furnace dimensions inside the insulation are nominally 27"×27"×27". A single burner is centered vertically in the wall opposite the sample. This burner is rated for 1.5 million Btu/hr and is of the flat flame or non-impinging flame design. Furnace conditions are monitored by three Inconel-sheathed chromel-alumel thermocouples. These thermocouples are positioned 6" from the face of the sample.

The sample was oriented vertically in the front opening of the chamber furnace.

The simulated test door assemblies must pass a 30 minute test for fire rating protocol in accordance with ASTM E 119. Three simulated door assemblies were tested. Test 1 was conducted on a door assembly wherein the thermoplastic door frame contained no intumescent filled cavity. Test 2 was conducted on a same simulated door assembly wherein one cavity of the extruded thermoplastic door frame was filled with the intumescent described above. Test 3 was also conducted on a same simulated door assembly as above, except that all of the cavities were filled with the same intumescent as employed in test 2.

The results were as follows:

Test 1—At 5 minutes after start of the test, smoke emitted from the top of the unexposed fire side of the assembly. At 5 minutes and 20 seconds, there were flames on the unexposed fire side of the plastic door frame and the plastic door was melting and burning.

Test 2—At 7 minutes after the test started, flames were seen from the right side of the unexposed fire side of the plastic door frame, but then the flames quickly stopped. At 30 minutes, there were flames from the unexposed fire side of the right side of the left plastic door frame. At 31 minutes, molten sealer started coming out of the left plastic door frame.

Test 3—At 45 minutes after start of the test, smoke emitted from the door assembly, but no flames on the unexposed fire side of the door assembly including the plastic door frame were seen. Since this was more than twice the time requirement of most building codes, the test was terminated.

As can be seen from the above tests, thermoplastic door frames with only one cavity filled with an intumescent in a multi-cavity door frame, the door frame meets or exceeds the test requirement for fire tests of door assemblies. With all of the cavities of the thermoplastic door frame filled with an intumescent, the door frame of the door assembly far exceeded the minimum test requirement of ASTM E 119.

It will thus be seen that the objects of this invention, as set forth above, among those made apparent from the preceding description are efficiently attained, and since certain changes may be made in carrying out the above invention, it is to be understood that the invention is not limited to the precise form. Changes and modifications may be made thereon without departing from the scope and spirit of the invention as defined in the appended claims.

What is claimed is:

1. A thermoplastic extruded door frame having an exterior surface and an interior honeycomb configuration forming a plurality of cavities, said cavities being filled with an intumescent material.

2. The thermoplasticarticle of claim 1, wherein the thermoplastic is acrylonitrile-butadiene-styrene.

3. The plastic article of claim 1, wherein the thermoset plastic is phenol formaldehyde.

4. A thermoplastic extruded door frame in accordance with claim 1 having a 30 minute fire endurance rating meeting ASTME 152 test wherein a door assembly is exposed to furnace temperatures of 1000° F. at 5 minutes after start of said test, 1300° F. at 10 minutes after start of said test, and 1550° at 30 minutes after start of said test.

* * * * *